United States Patent [19]

Walls

[11] 3,957,177

[45] May 18, 1976

[54] METERING APPLICATOR APPARATUS WITH PRESSURE REGULATING BYPASS

[75] Inventor: Leroy C. Walls, Valparaiso, Ind.

[73] Assignee: Leroy C. Walls, Chesterton, Ind.

[22] Filed: Nov. 1, 1974

[21] Appl. No.: 520,031

[52] U.S. Cl. .................................... 222/318; 138/46
[51] Int. Cl.[2] ........................................... G01F 11/00
[58] Field of Search .............. 222/318, 333; 138/46; 239/126

[56] References Cited

UNITED STATES PATENTS

| | | | |
|---|---|---|---|
| 1,992,736 | 2/1935 | Bronander et al. | 222/318 |
| 2,590,111 | 3/1952 | MacCracken et al. | 239/126 X |
| 2,599,680 | 6/1952 | Weeks | 239/126 X |
| 3,275,037 | 9/1966 | Andress | 138/46 |
| 3,390,815 | 7/1968 | Kavan et al. | 222/333 X |

*Primary Examiner*—Robert B. Reeves
*Assistant Examiner*—Francis J. Bartuska
*Attorney, Agent, or Firm*—Wegner, Stellman, McCord, Wiles & Wood

[57] ABSTRACT

A metering applicator apparatus has an accurately controlled fluid or compound discharge which discharge is the difference between the discharge of a constant displacement metering pump and the discharge of a pressure regulating device. The constant displacement metering pump discharges a constant predetermined volume and pressure of fluid. The pressure regulating device downstream of the constant displacement metering pump has a carefully controlled braking arrangement for controlling the volume and pressure of fluid maintained in the system with the balance being motored or bypassed through the pressure regulating device and back to a supply tank. The difference between the fluid from the constant displacement metering pump and the fluid motored or bypassed back to the tank is the volume of fluid at a constant pressure available at the applicator gun or nozzle. In one modification, a sequential means is connected to a motoring-metering applicator for step-by-step actuation and controlled intermittent discharge of fluid from said nozzle.

11 Claims, 7 Drawing Figures

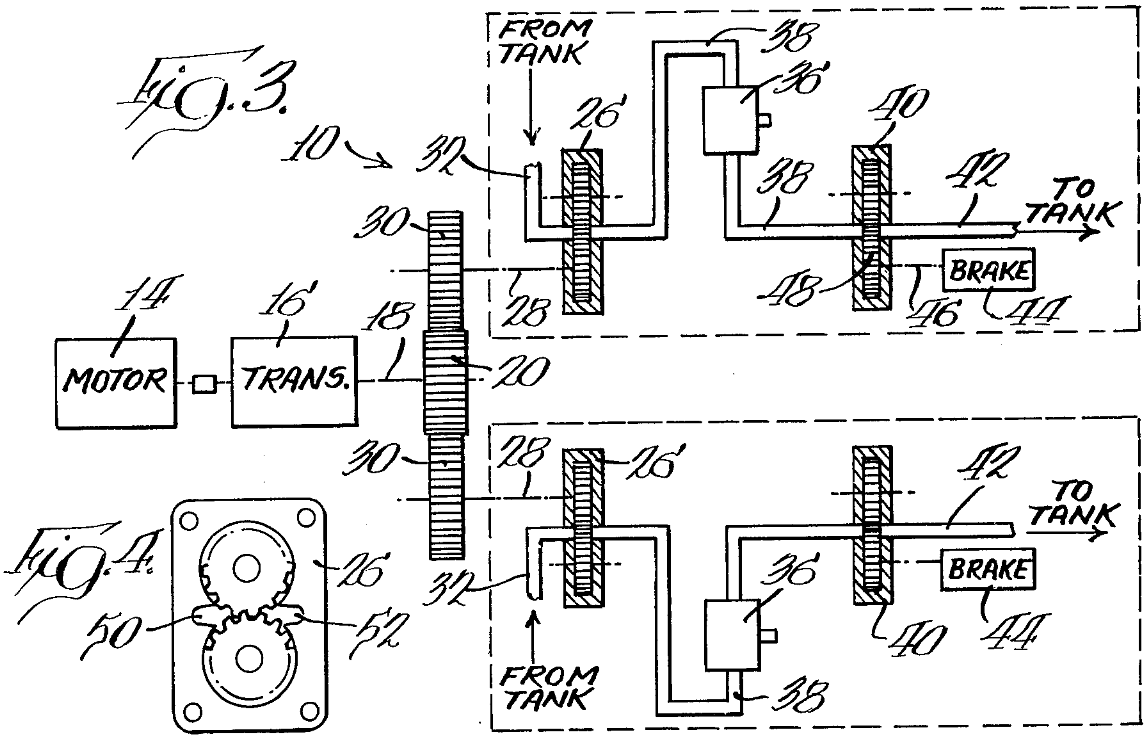
Fig. 3.
Fig. 4.
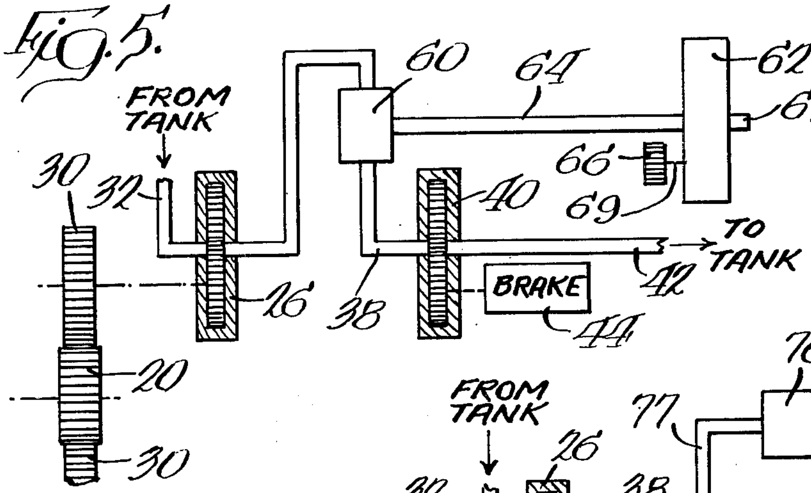
Fig. 5.
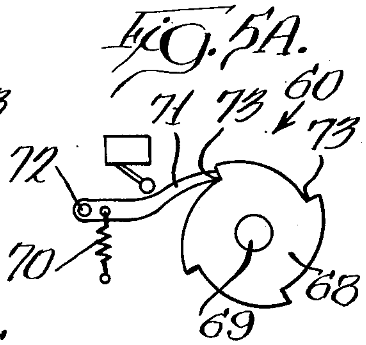
Fig. 5A.
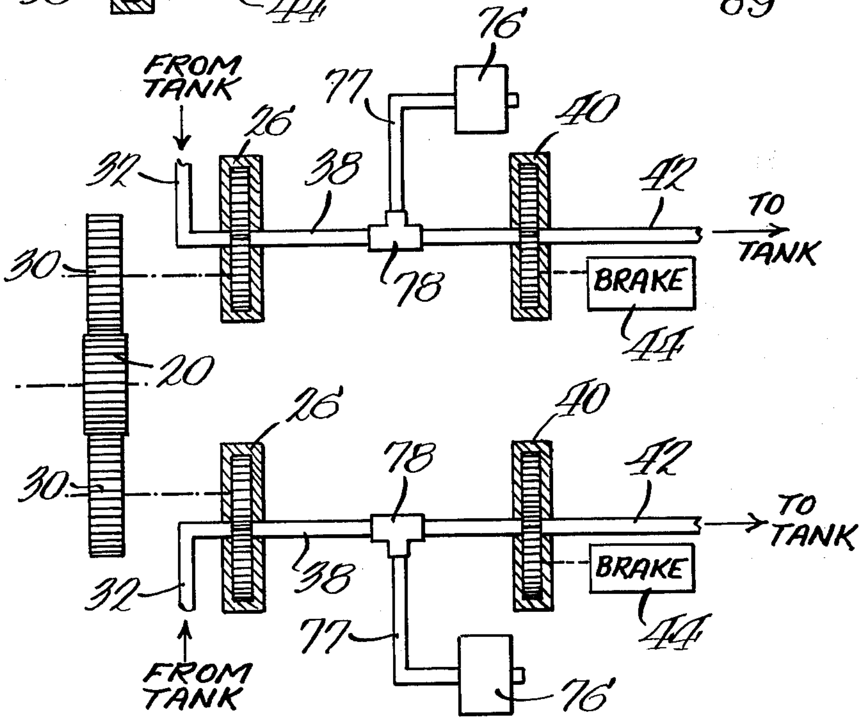
Fig. 6.

METERING APPLICATOR APPARATUS WITH PRESSURE REGULATING BYPASS

BACKGROUND OF THE INVENTION

1. Field of the Invention

This invention relates broadly to the field of metering applicator apparatus and, more particularly, to a constant displacement pump arrangement for an applicator for discharging carefully controlled amounts of fluid.

2. Description of the Prior Art

There are fields of endeavor that require the use of a carefully controlled amount of fluid that must be discharged from an applicator along a predetermined path. More specifically, for instance, in a high-speed can end processing machine, 400 or more can ends per minute are moved individually past a station where a controlled amount of fluid or compound is administered to each can end at a particular location on the can end.

The compound administered to the can end is either a hot melt thermoplastic or a rubber base material such as a latex which is administered in very limited quantities, at very high speeds and in such a way that, at least in one form of use, it will form a bead around the outer edge of the can end. The bead should not overlap excessively and should have a degree of integrity as applied to the rotating can end so as not to be spun or flung outward excessively from the locations where it is applied.

In order to administer the very limited quantities of fluid or compound to the can end in the very limited amount of time that the rotating can end is aligned with the nozzle, requires very careful control of the amount of fluid dispensed and requires an instantaneous start and stop of the dispensing cycle.

Heretofore, very complicated and expensive controls and pump arrangements have been provided for maintaining the source of compound to the applicator or nozzle within the requisite controlled limits. Because the amounts of fluid or compound to be discharged are so relatively minuscule, it has been difficult to provide the proper degree of control of the amounts of compound to the applicator resulting in less than totally efficient functioning of the applicator. Since the prior art devices are rather expensive and complicated, they frequently become jammed or their accuracy drifts and the precise amounts necessary are no longer obtainable.

SUMMARY OF THE INVENTION

The present invention makes use of small constant displacement gear pumps which discharge a very accurately controlled amount of compound into a line which circulates through the applicator gun or nozzle and on to a pressure regulating device downstream from the constant displacement metering pump and from the applicator. The pressure regulating device has a very accurately controlled brake arrangement which provides a braking force to the pressure regulating device so that a very carefully controlled amount of fluid or compound is maintained in the system with the balance being motored or bypassed through the pressure regulating device and back to the storage tank. In this way, the amount and pressure of the compound available for discharge from the applicator or nozzle is the difference between the output of the constant displacement metering pump and the output of the pressure regulating device which amount and pressure is very accurately controlled and is readily available at the applicator for discharge onto an end cap or the like. Stated another way, the applicator is maintained at the constant pressure required to overcome the braking force on the pressure regulating device.

A modification provides for an indexed metering device acting as the applicator gun or nozzle. The indexing will step-by-step permit the metering device to advance and with each advance a limited measured amount of compound is discharged from the applicator or nozzle.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 3 is a schematic view of my apparatus and shows two systems operated by one common power source;

FIG. 4 is a cross-sectional view taken on the line 4—4 of FIG. 1;

FIG. 5 shows a modification of the invention of FIG. 3 and includes a step-by-step metering gun arrangement;

FIG. 5A shows a ratchet plate as used in FIG. 5; and

FIG. 6 is a modification of my metering pump arrangement of FIG. 3.

DESCRIPTION OF THE PREFERRED EMBODIMENT

Figure 1:
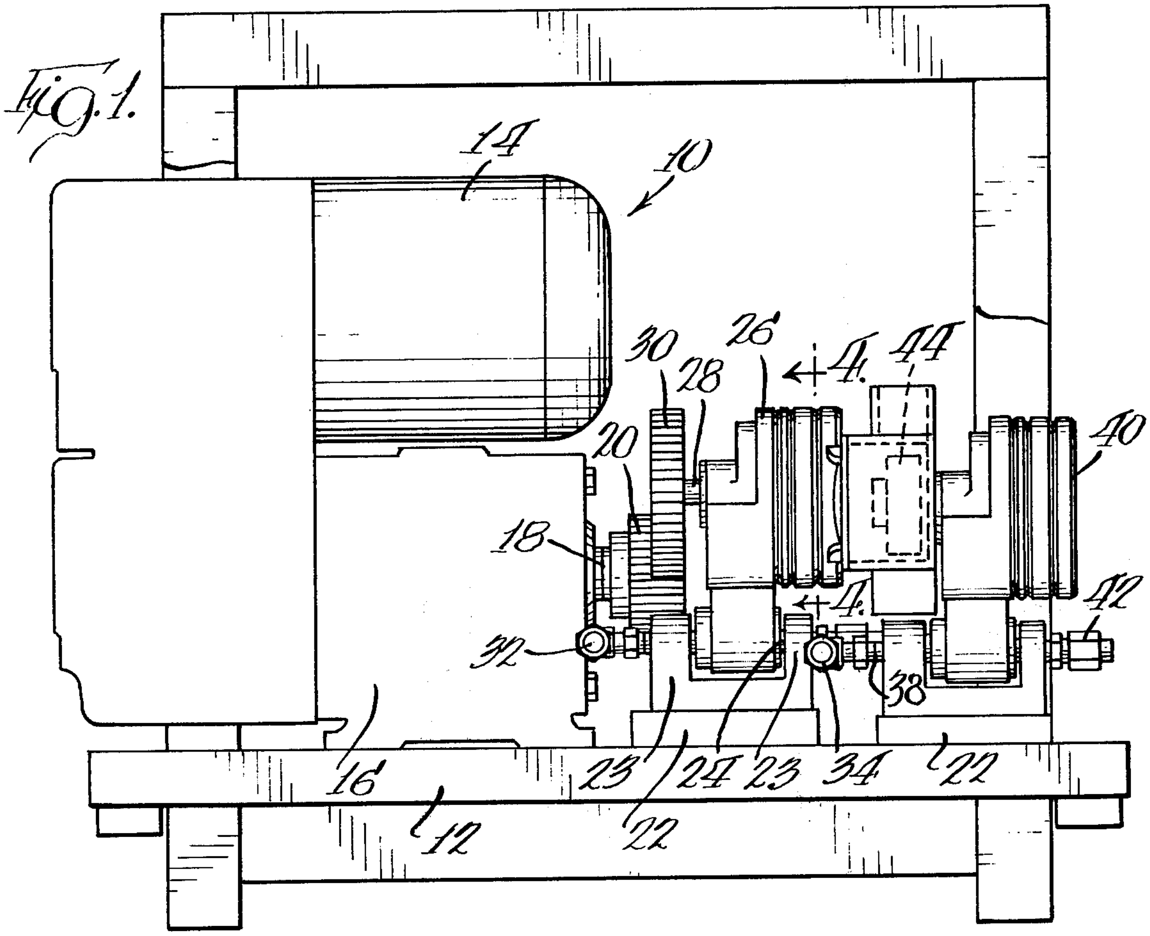
FIG. 1 is an elevational view of my metering applicator apparatus.
Figure 2:
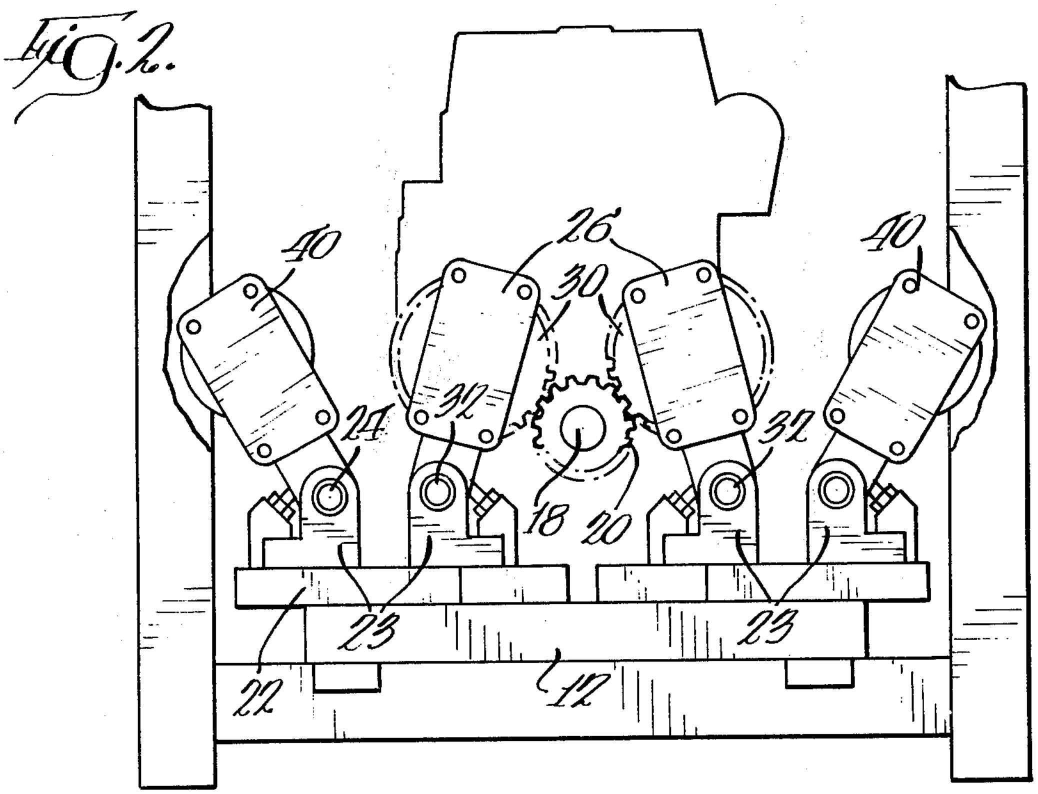
FIG. 2 is an end view of the metering applicator apparatus of FIG. 1.

Referring to the drawings and, in particular, to the device shown in FIGS. 1, 2 and 3, a metering applicator apparatus 10 is shown mounted on a base 12 and has a motor 14 which is operatively connected to a transmission 16 having an output shaft 18 upon which is keyed a pinion 20. Several adapter blocks 22 are mounted on the base 12 with each block having a pair of upstanding, spaced apart arms 23 through each one of which passes a hollow fluid carrying pivot rod 24. One pair of pivot rods 24 supports one end portion of a constant displacement metering gear pump 26 which pump is driven by a shaft 28 upon which is keyed a pinion 30 which is shown meshing with pinion 20 on the shaft of the transmission. The constant displacement pump 26 and pinion 30 may be pivoted out of engagement with pinion 20 to deactivate the pump 26 and related units of the system. The gear pump 26, shown and used in this device, is a gear-type constant displacement pump primarily of the type used in laboratories and could be a Zenith Products Company, of West Newton, Mass., metering pump such as shown in their Bulletin 7w-9657-B.

Mounted on the base 12 is a fluid supply tank (not shown) which has a pipe 32 connected to the hollow pivot rod 24 which is connected to the intake of the pump 26. The output 34 of the gear pump 26 passes through the other pivot rod 24 and is connected to and through an applicator gun 36 by piping 38 which continues on to a pressure regulating device 40. The pressure regulating device 40 is mounted on one of the adapter blocks 22 and has the piping 38 from the applicator gun 36 connected to what would normally be the output side of said pressure regulating device 40, and what would normally be the input side of said pressure regulating device is connected through piping 42 back to the supply tank. The pressure regulating device 40 is identical in construction to the constant displacement metering gear pump 26 except that the input and output ports are reversed and there is no external means for driving said pressure regulating device 40. The fluid or compound from the constant displacement pump 26 enters the pressure regulating device 40 through its output port and drives the gears of the pressure regulating device in a motoring fashion such that the fluid or compound motors through the pressure regulating device and is discharged through piping 42 back to the supply tank. A braking device such as a D.C. friction or magnetic particle brake 44 is mounted on a shaft 46 of one of the gears 48 of the pressure regulating device 40. The brake 44 is controlled by a variable control arrangement (not shown) such that a limited but finely controlled amount of current (i.e. 12 volts) can be dialed into the brake 44 such as to create a limited holding torque on the gears of the pressure regulating device 40. With the braking force of the brake 44 applied to the pressure regulating device 40, the pressure regulating device will not motor fluid or compound through the pressure regulating device until the pressure of the fluid or compound exceeds the holding force of the brake. Once the holding force of the brake is exceeded, the excess pressure of the fluid or compound will motor through the pressure regulating device 40 and be conveyed through pipe 42 back to the supply tank.

From the above, it can be seen that the pressure maintained in the line 38 and applicator gun 36 is the pressure generated by the constant displacement gear pump 26 that is required to overcome the braking force on the pressure regulating device 40. Therefore, the pressure at the applicator gun is the pressure required to motor the pressure regulating device 40 against the braking force of brake 44.

The apparatus is adapted for use in dispensing either hot melt thermoplastic compound such as polyamides or polyesters, or the like, or rubber base compounds such as latex, vinyl or the like. If the hot melt compounds are used, special precaution must be taken to prevent the material from solidifying in the system causing the system to freeze.

The constant displacement gear pumps 26, as shown in FIG. 1, are pivoted so that the pinions 30 engage the pinion 20 on the transmission. If it is desired to run only one applicator gun 36, the other pump 26 and pinion 30 are pivoted about the rods 24 to disengage the drive and deactivate that side of the apparatus.

The D.C. friction brake 44 is a commercially available brake, such as the brake manufactured by Simplatrol Products, Inc. numbered B-63 as shown on page 7 of their catalog S-1001. Various other brakes, such as magnetic particle brakes and the like, are available and can be substituted in the system with appropriate controls for setting the desired braking force on the gear of the pressure regulating device 40.

As is shown schematically in FIG. 3, the motor 14 drives the transmission 16 which in turn rotates the output shaft 18 and the pinion 20. Mating pinions 30 and 30 are designed with a particular number of teeth so as to result in the constant displacement gear pumps 26 receiving the proper number of turns to produce the requisite pressure and volume of compound or fluid from the supply tank for forcing through the piping 38, applicator gun 36, pressure regulating device 40 and back to the supply tank. Each constant displacement pump 26, as shown in FIG. 4, is a gear pump wherein fluid or compound is drawn in through the input 50 and is forced out the output 52 by the interaction of the driven gears of said pump. The output 52 of the gear pump 26 is connected to the applicator gun or nozzle 36 and to the output of the pressure regulator device 40. The pressure regulating device 40 has the input and output ports reversed and does not have any drive motor connected thereto, but the pressure of the fluid or compound entering the output of the regulating device causes the gears to rotate in a motoring manner and to discharge a measured amount of fluid or compound through the input and back to the supply tank. The D.C. friction brake 44 is connected to the drive shaft of one of the gears 48 of the pressure regulating device 40 and is designed in such a way that a predetermined braking force can be applied to resist the motoring of the pressure regulating device 40. As a result, by controlling the amount of braking force on the gears of the pressure regulating device 40, the pressure regulating device will motor to a lesser degree than in a nonbraked condition and, accordingly, will permit only that fluid in excess of the amount needed to overcome the brake 44 to pass therethrough back to the tank. The constant displacement gear pump 26 is designed to discharge fluid at a certain rate per minute which is a higher value than that required to overcome the braking force on the pressure regulating device 40 with the surplus being permitted to motor through the pressure regulating device 40. The amount and pressure of fluid or compound available at the applicator gun for discharge is either the pressure of the fluid needed to overcome the braking force on the pressure regulating device 40, or is the pressure difference between the output of the constant displacement pump 26 and the output of the pressure regulating device 40.

As shown in FIG. 3, two separate sets of metering gear pumps 26, applicator guns 36 and pressure regulating device 40 with attached D.C. friction brakes 44 are provided. In this way, one motor 14 and transmission 16 combination is capable of producing metered pressure and discharge at two separate applicator stations. The applicator gun 36 can be an electromechanical gun such as manufactured by The Nordson Company and is called a "Pneumatic Gun" or can be an air-operated gun.

As shown in the modification of FIG. 5, a T-joint 60 is provided in the line 38 from the output of the metering gear pump 26 to the output (input) of the pressure regulating device 40 with a metering device 62 being provided in the line 64 from the T-joint 60 to the applicator nozzle 63. The metering device 62 has a pair of meshing gears the same as the pressure regulating device 40 with the gears motoring freely under the pressure of the fluid or compound in the line 64 with the motoring motion being arrested by a ratchet mechanism 66. The ratchet mechanism 66 is shown in FIG. 5A and consists of a ratchet plate 68 mounted on a shaft 69 connected to one metering device of the gear 62 with a solenoid 70 connected to an intermediate portion of a dog or lever 71 which is pivoted at 72 to the frame. The end of lever 72 engages with one of the series of detents 73 formed on the ratchet plate 68. The space between the adjacent detents 73 is calculated to permit the metering device 62 to motor a predetermined amount of fluid or compound through the metering device 62 and out the nozzle 63. The solenoid 70 is actuated to raise the dog 71 to permit the ratchet plate 68 and metering device 62 to rotate as described above. The lever 71 will engage a cutoff switch 74 to deactivate the solenoid and permit the lever to drop onto the next land on the ratchet plate 68 ready to engage the next detent 73 and arrest further motoring of the metering device. The solenoid is actuated at a predetermined time sequence which permits the metering device to discharge through the nozzle 63 a predetermined controlled amount of fluid or compound. Each time the ratchet releases, the metering device advances the predetermined number of degrees and a predetermined amount of fluid or compound is discharged from the gun or nozzle.

In FIG. 6, a system similar to the system of FIG. 3 is illustrated with the exception that applicator guns 76 are connected by piping 77 to a T-joint 78 in the piping 38 between the output of the metering pump 26 and the (output) input of the pressure regulating device 40. The fluid under pressure between the metering pump and the pressure regulating device is advanced through the T-connection 78 to the gun 76 where it is discharged in a controlled fashion. This system is called "deadheading" the compound to the gun 76, but does not circulate the material through the gun as is true in the FIG. 3 version. This system requires that the piping 77 be heated to prevent the hot melt material or compound in the piping 77 from solidifying and jamming the apparatus.

In practice, it has been found that the apparatus has a much more accurate, uniform and more reliable discharge rate per shot of fluid from the gun or nozzle due, at least in part, to the cushion of material flowing between the constant displacement pump 26 and the pressure regulating device 40. That is, the discharge rate of the constant displacement pump 26 is in excess of the material to overcome the braking force on the pressure regulating device, which excess may be bypassed to the tank or may be discharged at the gun or nozzle so that the pressure on the system never drops critically below that required to overcome the braking force on the pressure regulating device. Heretofore, constant pressurized systems would drop critically low each time the nozzle or gun was opened so that the material being discharged was discharged, at the outset, at high pressure and, at the end of discharge, was at a lower or low pressure resulting in tailing off of the material being discharged.

I claim:

1. In a metering applicator apparatus having a base, a motor mounted on said base and operatively connected to a transmission, a shaft driven by said transmission and having a pinion keyed thereon, constant displacement gear pump means driven by said pinion, means for conveying compound from a tank to the input of said gear pump means, the output of said gear pump means being connected to an applicator gun and to an inlet of a pressure regulating device, said pressure regulating device having a pair of meshing gears into which the compound from the gear pump means is fed, brake means connected to one gear of the pressure regulating device for controlling the amount of compound motored through said gears of said pressure regulating device, the outlet of said pressure regulating device is connected with said tank whereby the metered volume and pressure of compound available at the applicator gun is the differential between the amount of compound discharged from the constant displacement gear pump means and the amount of compound bypassed back to the tank by the brake controlled pressure regulating device.

2. The metering applicator apparatus of claim 1 wherein said brake means is a D.C. brake.

3. The metering applicator apparatus of claim 1 wherein said applicator gun is located directly in the line from the constant displacement gear pump means to the pressure regulating device and said compound circulates through said applicator gun between discharge pulses of said applicator gun.

4. The metering applicator apparatus of claim 1 wherein at least two constant displacement gear pump means are driven by said pinion on said shaft of said transmission, each constant displacement gear pump means having an applicator gun, pressure regulating device and brake means for controlling said pressure regulating device whereby at least two applicator guns are provided with metered amounts of compound.

5. The metering applicator apparatus of claim 1 wherein the applicator gun is a metering device having a pair of meshing gears and a discharge nozzle, means for connecting said metering device to the line running between said constant displacement gear pump means and said pressure regulating device, and means for releasing one gear of said metering device for incremental advancement of said pair of meshing gears for discharging a controlled amount of compound through said metering device and from said nozzle.

6. The metering applicator apparatus of claim 5 wherein said last-named means is a ratchet plate mounted on the shaft upon which one gear of said metering device is mounted, dog means engage with one detent of said ratchet plate and means for retracting said dog means to permit the gear and ratchet plate of said metering device to advance to the next detent whereby the gears of the metering device motors the metered amount of compound to said nozzle.

7. A metering applicator apparatus having a base, a motor mounted on said base and operatively connected to a transmission, a shaft driven by said transmission, constant displacement gear pump means driven by said shaft, said gear pump means being connected to an applicator gun and to an inlet of a pressure regulating device, said pressure regulating device having a pair of meshing gears through which a metered discharge from the constant displacement gear pump means passes, brake means connected to one gear of the pressure regulating device for applying braking torque to said gears of said pressure regulating device, whereby the pressure of a metered discharge from the applicator gun is equal to the pressure required to overcome the braking force of the brake means on the gear of the pressure regulating device.

8. The metering applicator apparatus of claim 7 wherein said applicator gun is located directly in the line from the constant displacement pump means to the pressure regulating device so that the compound may circulate through said applicator gun.

9. A metering applicator apparatus having a motor operatively connected to a transmission, an output shaft driven by said transmission, metering gear pump means driven by said shaft, means for conveying fluid from a tank to said gear pump means, the output of said metering gear pump means being connected by conduit means to a pressure regulating device, said pressure regulating device having a housing with a pair of freely rotatable meshing gears therein, brake means connected to one of said gears in said pressure regulating device for controlling the amount of pressure on the fluid in said conduit means with fluid under pressure in excess of the pressure required to overcome said brake means being bypassed back to said tank, and discharge means connected to said conduit means for discharging fluid under pressure which pressure is equal to the pressure required to overcome said brake means.

10. The metering applicator apparatus of claim 9 wherein the discharge means is an applicator gun which is a metering device having a pair of meshing gears and a discharge nozzle, means for connecting said metering device to the line between said metering gear pump means and said pressure regulating device, and means for releasing said gears of said metering device for incremental advancement for discharging a controlled amount of fluid from said nozzle.

11. The metering applicator apparatus of claim 10 wherein said last-named means is a ratchet plate mounted on a shaft upon which one gear of said metering device is mounted, dog means engaging with one detent of said ratchet plate and means for disengaging said dog means from said detent to permit the gear and ratchet plate of said metering device to advance to the next detent whereby the gears of the metering device motors the metered amount of fluid to said nozzle.

* * * * *